United States Patent [19]

Hiramatsu

[11] Patent Number: 5,488,225
[45] Date of Patent: Jan. 30, 1996

[54] ROTARY SCANNER AND LIGHT BEAM SCANNING SYSTEM HAVING A SPECIFIED RELATIONSHIP BETWEEN THE FACETS OF THE SCANNING MIRROR AND THE COMMUTER SEGMENTS OF THE MOTOR

[75] Inventor: Koji Hiramatsu, Toyokawa, Japan

[73] Assignee: Minolta Camera Kabushiki Kaisha, Osaka, Japan

[21] Appl. No.: 253,341

[22] Filed: Jun. 3, 1994

[30] Foreign Application Priority Data

Jun. 7, 1993 [JP] Japan ................................ 5-136259
Jul. 27, 1993 [JP] Japan ................................ 5-185038

[51] Int. Cl.$^6$ ............................................... H01J 3/14
[52] U.S. Cl. ............................ 250/236; 318/541; 310/89
[58] Field of Search ............................. 250/235, 236; 359/877, 198, 199, 200, 212, 216; 318/245, 538, 539, 540, 541, 542; 310/89, 90, 51, 241, 229, 230

[56] References Cited

U.S. PATENT DOCUMENTS

| 3,662,198 | 5/1972 | Adams, Jr. ................................ 310/87 |
| 4,538,081 | 8/1985 | Kaniya et al. ............................ 310/90 |
| 4,623,216 | 11/1986 | Sato et al. ................................ 350/6.8 |
| 4,631,463 | 12/1986 | Klinchuch ................................ 318/558 |
| 4,756,586 | 7/1988 | Witteveen ................................ 310/51 |
| 4,936,671 | 6/1990 | Kaspar ...................................... 359/877 |
| 5,033,835 | 7/1991 | Platzer, Jr. ................................ 359/877 |

Primary Examiner—Edward P. Westin
Assistant Examiner—Steven L. Nichols
Attorney, Agent, or Firm—Willian Brinks Hofer Gilson & Lione

[57] ABSTRACT

A rotary scanner having a mirror with a plurality of deflecting facets for deflecting a light beam and a motor for rotating the mirror. The motor has a plurality of commutator segments and brushes, and at least one commutation position can be seen from outside. Further, the commutation positions are located at corresponding points with borders among the deflecting facets of the mirror.

17 Claims, 18 Drawing Sheets

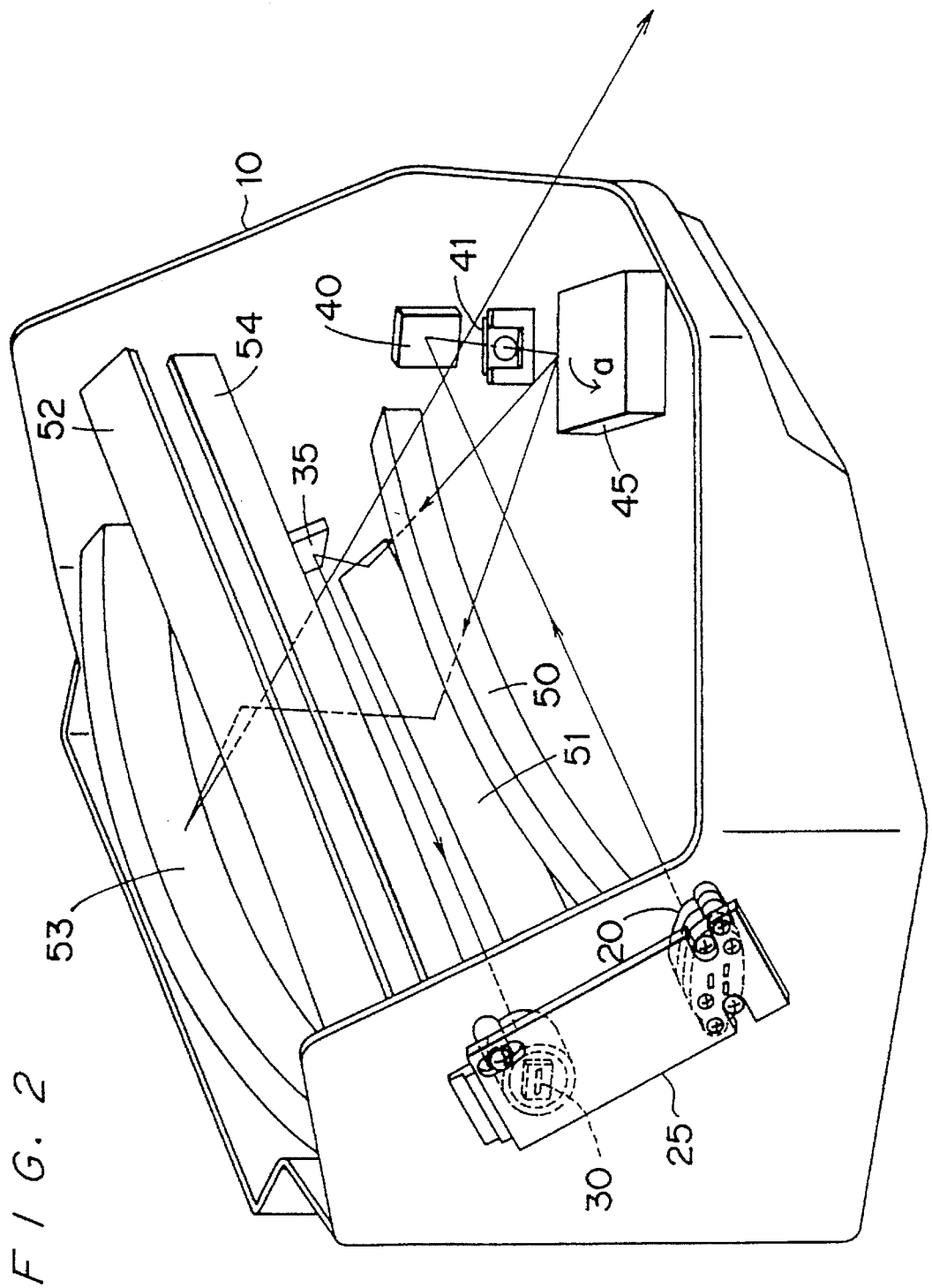
F I G. 2

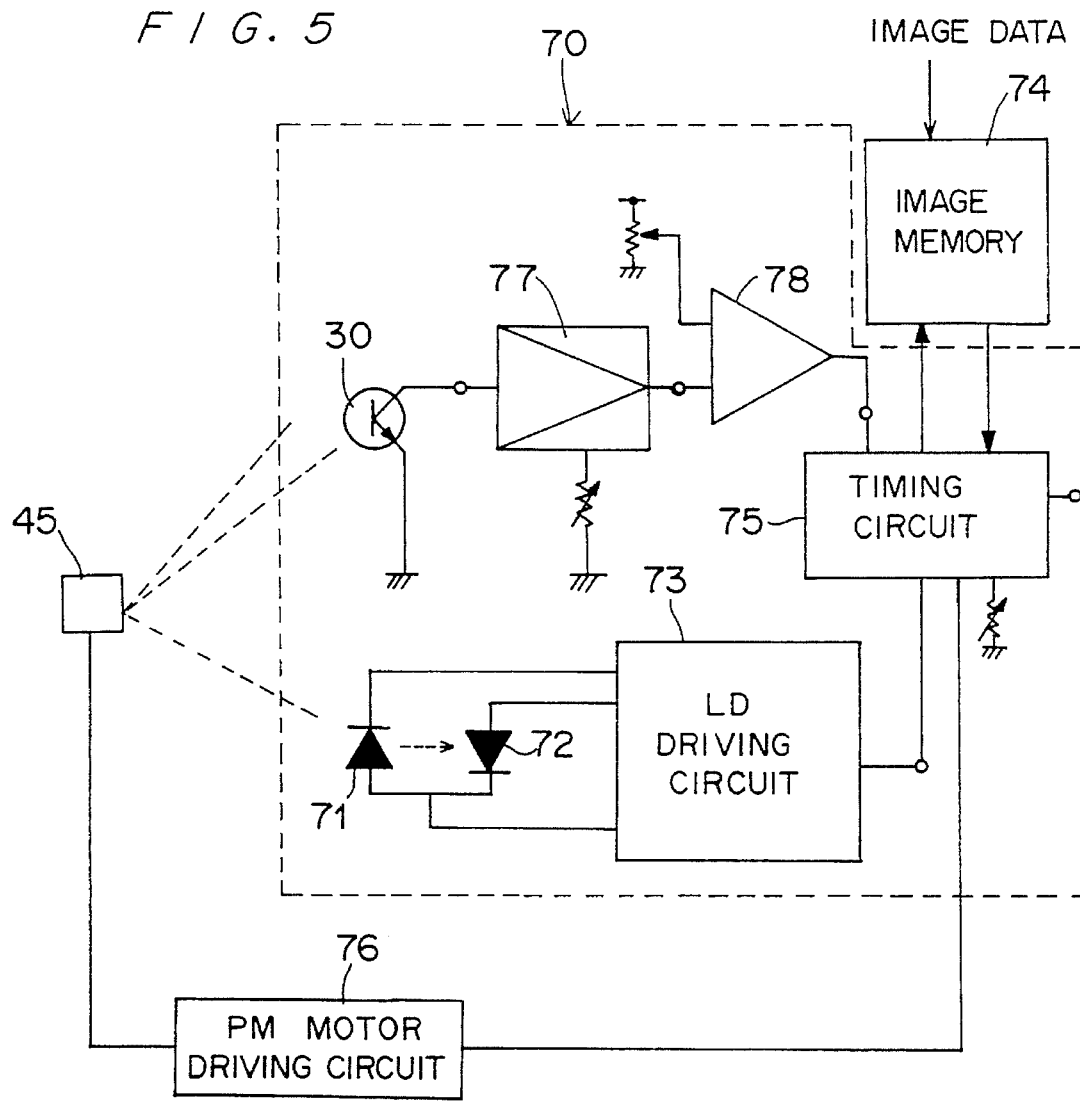

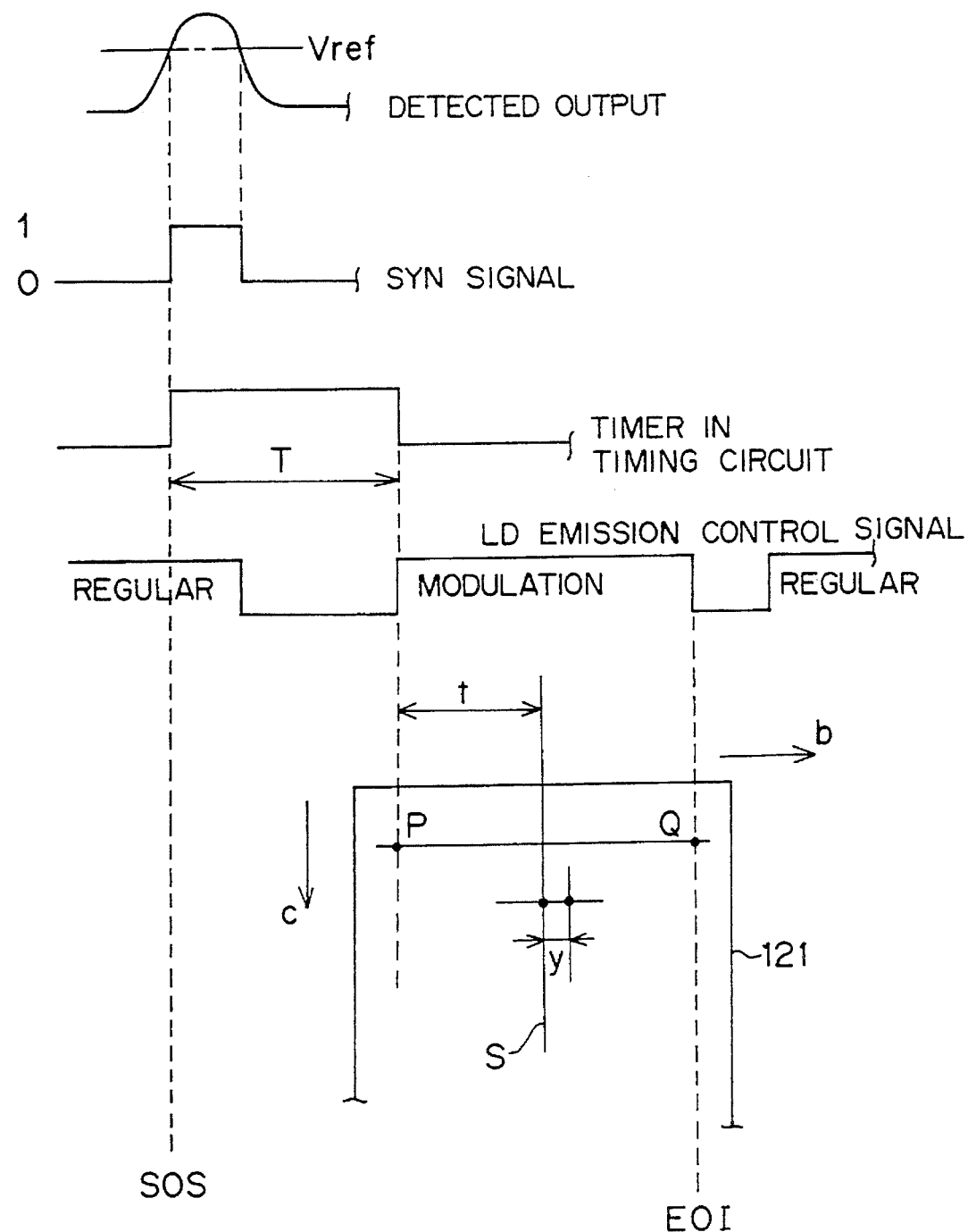

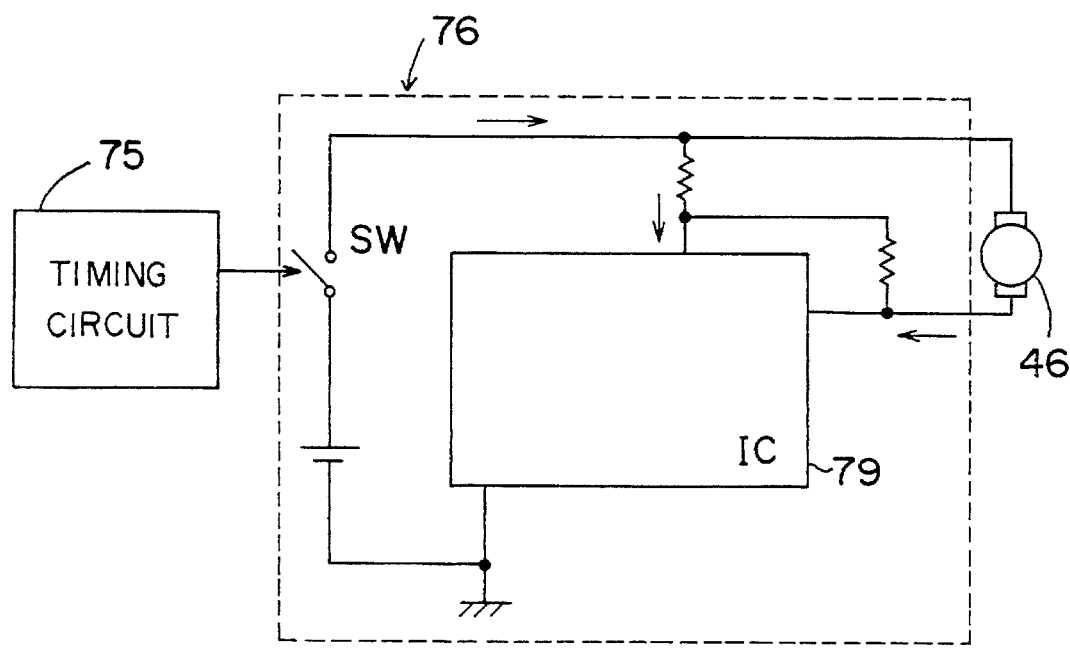
F I G. 11

F I G. 21
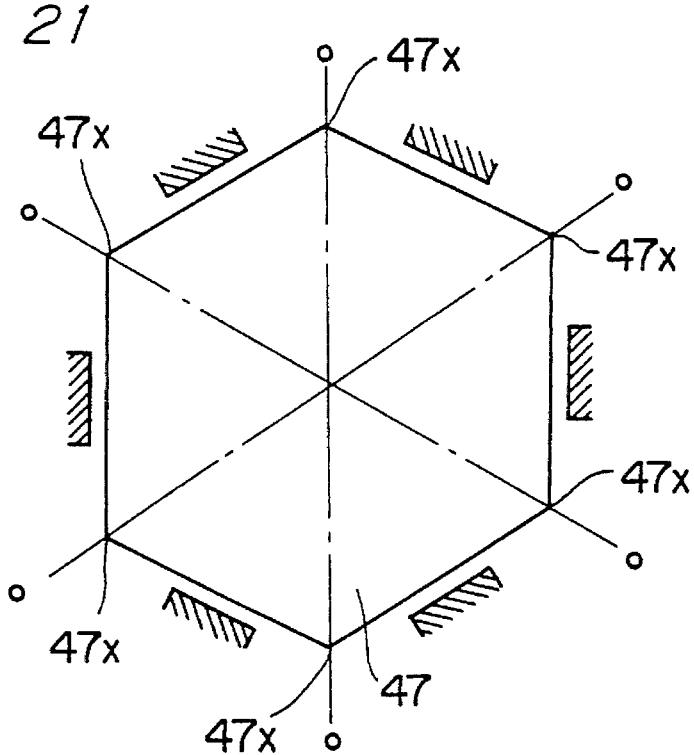
F I G. 22
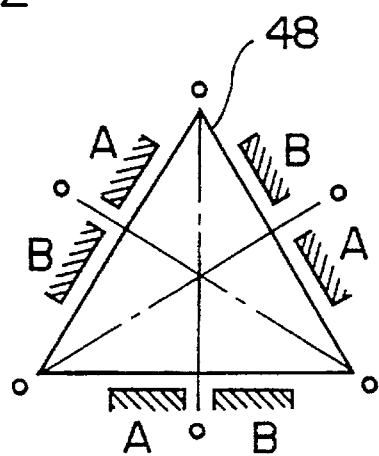

ROTARY SCANNER AND LIGHT BEAM SCANNING SYSTEM HAVING A SPECIFIED RELATIONSHIP BETWEEN THE FACETS OF THE SCANNING MIRROR AND THE COMMUTER SEGMENTS OF THE MOTOR

BACKGROUND OF THE INVENTION

1. Field of the Invention

The present invention relates to a rotary scanner and a light beam scanning system, and more specifically to a rotary scanner for scanning a light beam emitted from a light source on a light receiving surface and a light beam scanning system with such a rotary scanner.

2. Description of Related Art

A light beam scanning system provided with a polygonal mirror has been developed into various types to be used as an image writing device and an image reading device. The polygonal mirror is driven to rotate by a motor at a constant speed. If the motor cannot keep the constant speed, accurate image formation will be impossible. Incidentally, motors are classified into brush motors and brushless motors, and a brushless motor is used to drive the polygonal mirror. Brushless motors are good in the accuracy of rotation but expensive. Brush motors are inexpensive. However, since brush motors are inferior in the accuracy of rotation, they have not been used for driving a polygonal mirror.

SUMMARY OF THE INVENTION

An object of the present invention is to provide a rotary scanner which has a brush motor as the drive source and a light beam scanning system with the rotary scanner which can form an accurate image.

The inventors conducted various tests of brush motors, which are inexpensive and inferior in the accuracy of rotation. As a result, the followings were found out: when a commutator segment comes out of contact with a brush and another commutator segment comes into contact with the brush, that is, in a moment of commutation, an induced voltage occurs, which changes the torque and changes the rotating speed of the brush motor; and in other moments, the brush motor can keep a constant speed as a brushless motor does.

Therefore, it should be found out at what rotation angle of the rotary scanner commutation occurs, and scanning should be performed during rotation of the rotary scanner within a range excluding the angle where commutation occurs. In this way, practically a brush motor can work as a brushless motor does.

The present invention is based on the discovery. A rotary scanner according to the present invention comprises a mirror which has at least one deflecting facet, and a motor for rotating the mirror, the motor being a brush motor with a plurality of commutator segments, and at least one commutation position where a brush is released from contact with a commutator segment and comes into contact with another commutator segment can be seen from outside. Since the commutation position can be seen from outside, fitting of the mirror to the motor can be adjusted such that the effective region of the deflecting facet which deflects the laser beam for scanning will be out of the commutation position. In other words, the mirror can be fitted to the motor such that the light beam reflected by the mirror in the moment of commutation will not be used for scanning.

If the mirror has a plurality of deflecting facets, commutation positions should be located at corresponding points with borders among the deflecting facets. Thereby, the effective region of each deflecting facet can be set out of the commutation positions, and scanning of a light beam on a light receiving surface can be carried out while the mirror is driven at a constant speed.

Further, in the rotary scanner according to the present invention, supposing that the number of the deflecting facets is L and that the number of occurrences of commutation during one rotation of the motor is M, L and M preferably have a mutual relationship satisfying the following condition: L=M×n or alternatively M=L×n (n: natural number). If the condition is satisfied, the effective region of each deflecting facet can be set to be relatively large, and in this case, the fitting of the mirror to the motor does not require so high an accuracy.

A light beam scanning system according to the present invention has a rotary scanner which comprises a mirror having at least one deflecting facet and a brush motor for rotating the mirror and commutation positions of the motor are out of the effective region of the deflecting facet where the mirror deflects a laser beam for scanning. In the structure, scanning is carried out with beams which are deflected by the mirror while the motor keeps a constant speed, and an image can be formed accurately.

The light beam scanning system further has a photosensor which receives a light beam deflected by the deflecting facet with rotation of the mirror and generates a synchronization signal. In the light beam scanning system, driving means of a light source starts modulation emission in accordance with image data based on the synchronization signal generated from the photosensor, and commutation occurs at a moment out of a period from a moment where the photosensor receives the laser beam to a moment where scanning of the laser beam for forming an image of at least one size ends. In this structure, image disorder can be prevented more effectively.

Further, if the field angle is larger, and the effective region of the deflecting facet must include a commutation position, that is, if a commutation moment must be included in a period of scanning, the commutation moment should be set as close as possible to the end of the scanning. Thereby, the influence of the commutation on the image can be avoided to the utmost.

BRIEF DESCRIPTION OF THE DRAWINGS

This and other objects and features of the present invention will be apparent from the following description with reference to the accompanying drawings, in which:

FIG. 2 is a perspective view of the laser beam scanning system;

FIG. 5 is a block diagram of a control circuit of the laser beam scanning system;

FIG. 6 is a time chart showing the action timing of the laser beam scanning system;

FIG. 11 is a block diagram of a driving circuit of the polygonal mirror motor;

FIG. 21 is an explanatory view of commutation positions in a case wherein another polygonal mirror is fitted to the polygonal mirror motor; and FIG. 22 is an explanatory view of commutation positions in a case wherein another polygonal mirror is fitted to the polygonal mirror motor.

DETAILED DESCRIPTION OF THE PREFERRED EMBODIMENTS

A preferred embodiment of the present invention is described with reference to the accompanying drawings.

The embodiment is a laser printer provided with a rotary scanner and a light beam scanning system according to the present invention.

Figure 1:
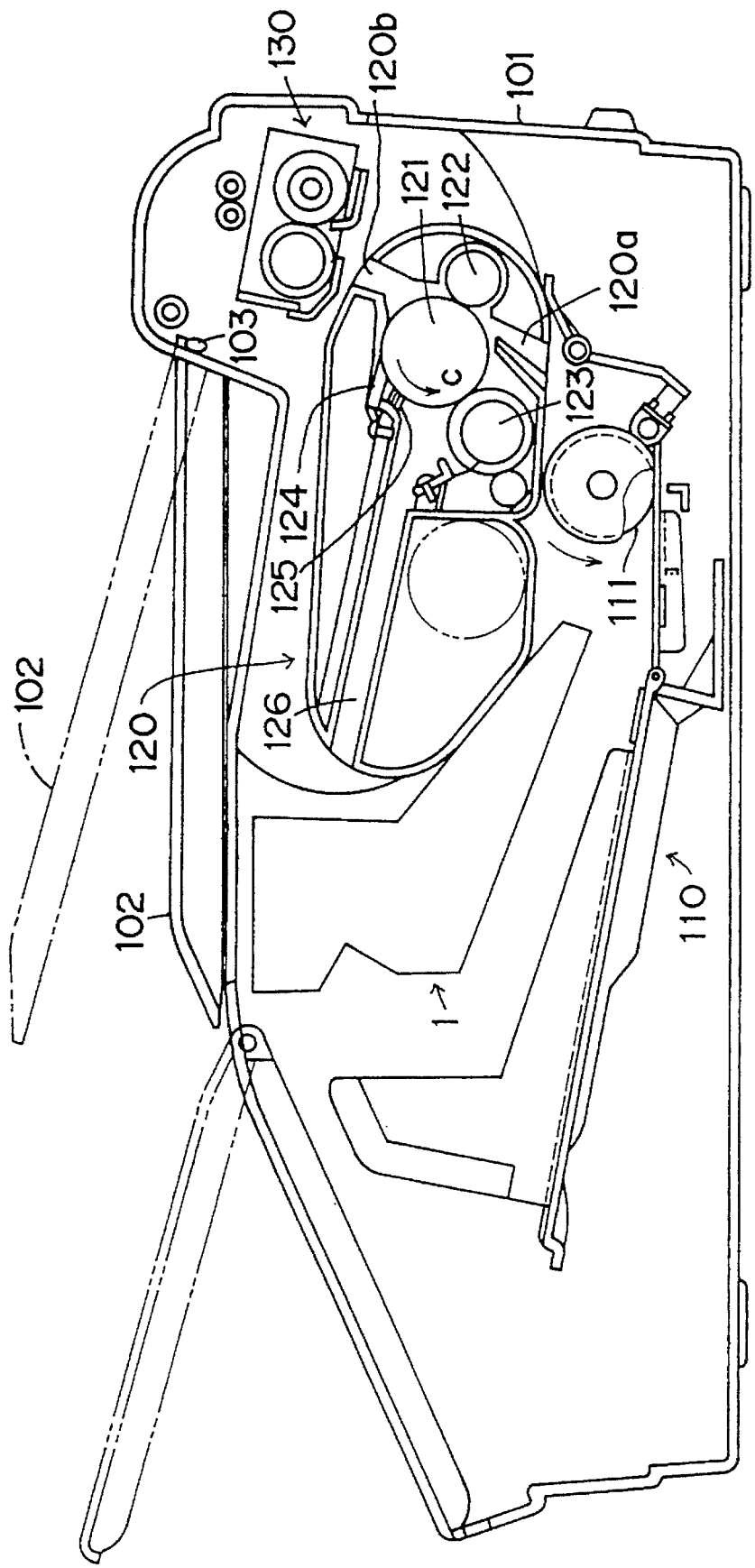
FIG. 1 is a schematic view of a laser printer provided with a laser beam scanning system which is an embodiment of the present invention.

Referring to FIG. 1, first, the general structure of the laser printer is described. The laser printer comprises, in a body frame 101, a laser beam scanning system 1, a sheet storage 110, an image formation cartridge 120, a fixing device 130, etc. A cover 102 is provided in an upper portion of the body frame 101 so as to pivot upward on a pin 103. The cover 102 serves as an ejected-sheet tray during printing operation, and when the cover 102 is lifted upward, maintenance of the internal parts is possible.

Sheets are stacked in the sheet storage 110, and the sheets are fed out thereof one by one with rotation of a feed roller 111 and fed into a sheet path 120a in the image formation cartridge 120.

The image formation cartridge 120 is a unit of a photosensitive drum 121, a transfer roller 122, a developing device 123, a residual toner cleaner 124, a residual charge eraser 125. etc. The image formation cartridge 120 has a slit 126 which leads a laser beam emitted from the laser beam scanning system 1 to the photosensitive drum 121, and with rotation of the photosensitive drum 121 in a direction indicated with arrow c, an electrostatic latent image is formed thereon. The electrostatic latent image is developed by the developing device 123, and the developed image is transferred onto a sheet by discharge from the transfer roller 122. The sheet which has an image transferred is fed to the fixing device 130 through a sheet path 120b, and the transferred image is fixed thereon. Then, the printed sheet is ejected onto the cover 102.

Next, the laser beam scanning system 1 is described.

Figure 3:
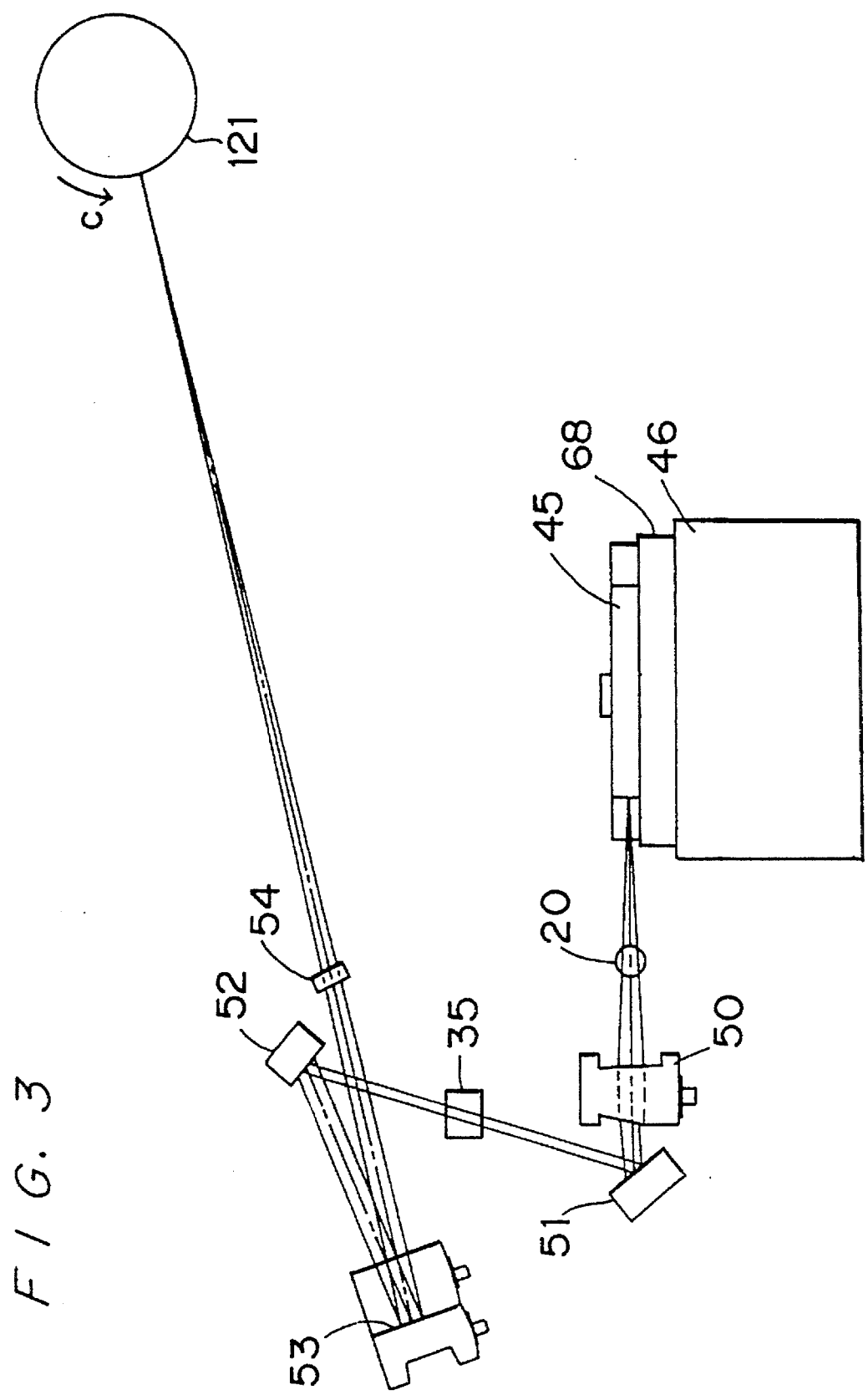
FIG. 3 is a side view of the laser beam scanning system.
Figure 4:
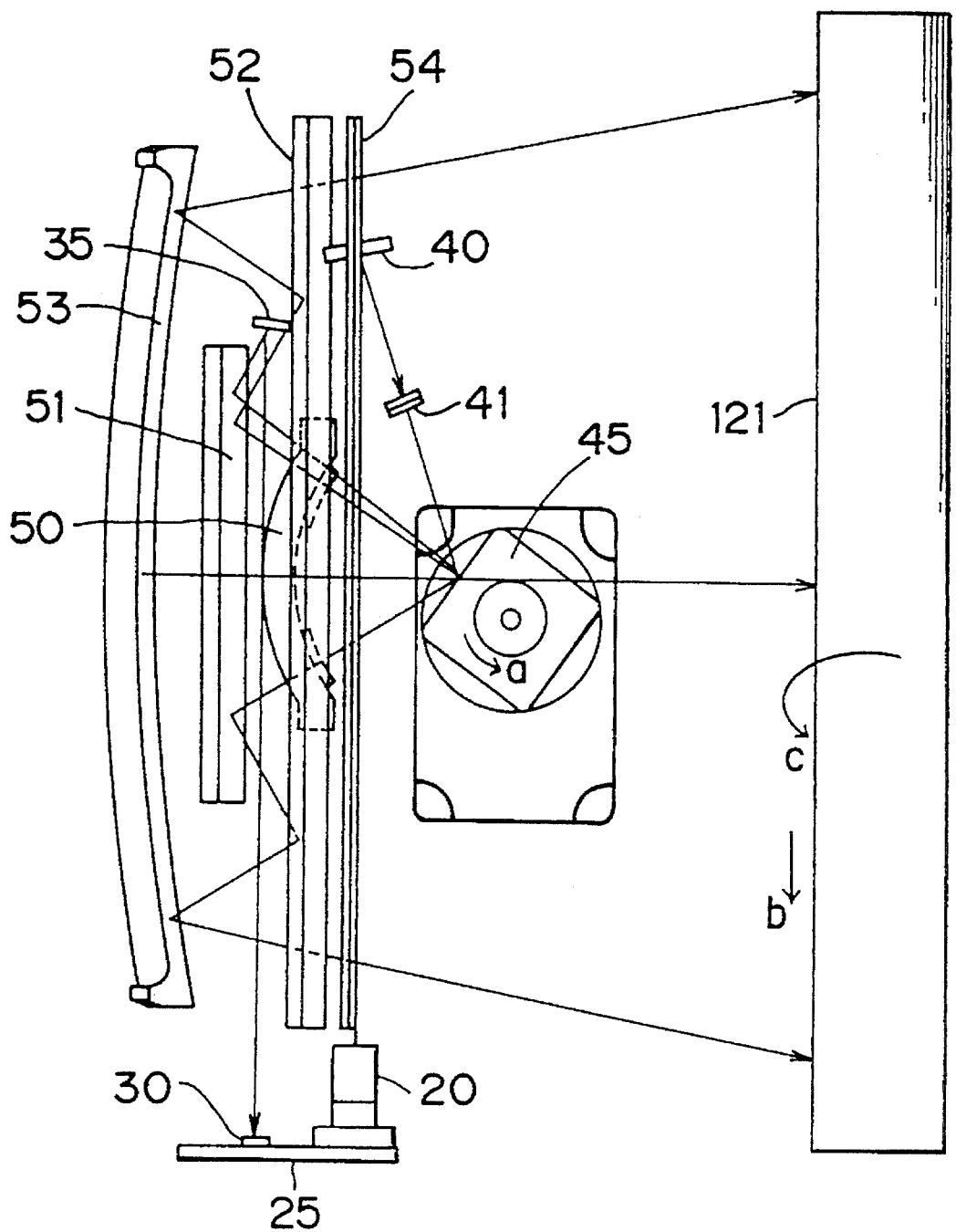
FIG. 4 is a plan view of the laser beam scanning system.
Figure 8:
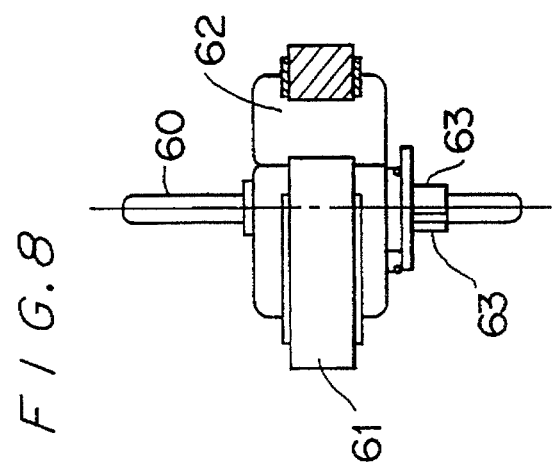
FIG. 8 is a half sectional view of the polygonal mirror motor, showing the internal composition thereof.
Figure 7:
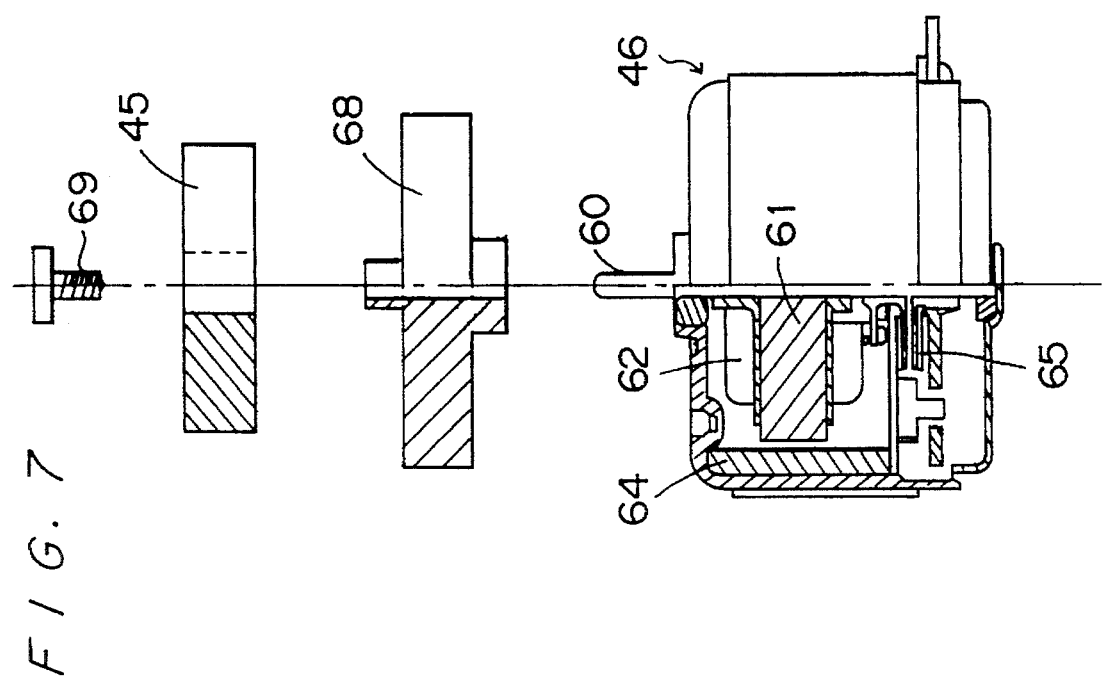
FIG. 7 is a half sectional view of a polygonal mirror and a polygonal mirror motor, showing the composition of the motor and the fitting of the polygonal mirror to the motor.
Figure 9:
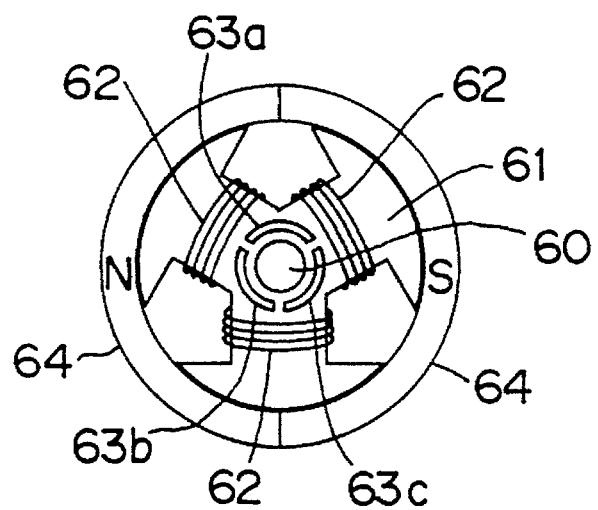
FIG. 9 is a plan view of the polygonal mirror motor, showing the positions of the internal components thereof.
Figure 10:
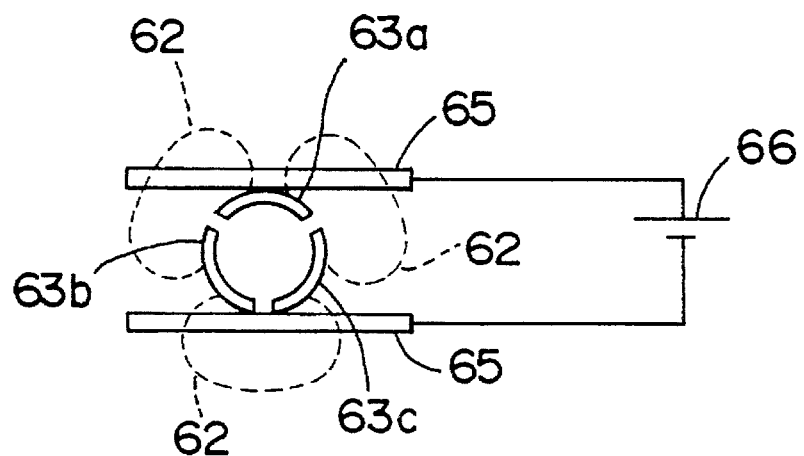
FIG. 10 is an explanatory view of a commutator and brushes of the polygonal mirror motor, showing the positional relationship therebetween.

FIGS. 2, 3 and 4 show the composition of the laser beam scanning system 1. The laser beam scanning system 1 consists mainly of a housing 10 which is molded out of resin, a light source unit 20, and a photosensor 30 for detecting a printing start position (hereinafter referred to as SOS sensor), a polygonal mirror 45, a toric lens 50 and a toroidal mirror 53.

A laser beam emitted from the light source unit 20 is reflected by a plane mirror 40, passes through a cylindrical lens 41 and is incident to the polygonal mirror 45. The polygonal mirror 45 has four deflecting facets on the periphery and is driven by a motor 46 to rotate in a direction indicated with arrow a at a constant speed. Thereby, the laser beam deflected by the deflecting facets of the polygonal mirror 45 is scanned in a plane at a constant angular velocity. The scanned laser beam passes through the toric lens 50 and is reflected by plane mirrors 51 and 52. The laser beam is further reflected by the toroidal mirror 53 and is imaged on the photosensitive drum 121 via a glass plate 54. The photosensitive drum 121 is driven to rotate in a direction indicated with arrow c. An electrostatic latent image is formed on the photosensitive drum 121 with the main scanning of the laser beam in the direction of arrow b and the rotation of the photosensitive drum 121 in the direction of arrow c (sub scanning).

A plane mirror 35 is disposed after the plane mirror 51, just before the starting edge in the main scanning direction. A laser beam reflected by the plane mirror 51 at the starting edge is reflected by the plane mirror 35 and is incident to the SOS sensor 30. Based on the detection of the SOS sensor 30, scanning of each line on the photosensitive drum 121 is started.

The light source unit 20 comprises, in a casing, a laser diode 71 which is a laser source (see FIG. 5), a photodiode 72 for monitoring the quantity of light (see FIG. 5) and a collimator lens (not shown) for collimating the laser beam. The light source unit 20 is fitted on the reverse side of a circuit board 25. On the front side of the circuit board 25, elements of a control circuit of the laser diode 71 are mounted.

Now, referring to FIG. 5, the control circuit 70 of the laser beam scanning system 1 and timing of switching the laser beam emission between regular emission and modulation emission.

The laser diode 71 is controlled by an LD driving circuit 73 to perform regular emission and modulation emission. Meanwhile, the quantity of light of the emitted laser is detected by feedback. More specifically, the photodiode 72 monitors the quantity of light of a rear beam of the emitted laser, and the monitored data are sent back to the LD driving circuit 73. Image data are sent from an external appliance such as a host computer to an image memory 74 and further sent to the LD driving circuit 73 via a timing circuit 75. The timing circuit 75 also sends a control signal to a driving circuit 76 of the polygonal mirror motor 46.

The laser beam of regular emission is detected by the SOS sensor 30 in due time. Then, the detected output is amplified by an amplifier 77 and compared with a threshold voltage $V_{ref}$ (see FIG. 6) by a comparator 78. If the output of the amplifier 77 is larger than the threshold voltage $V_{ref}$, the comparator 78 generates a signal of "1" (synchronization signal), and if the output is smaller than the threshold voltage $V_{ref}$, the comparator 78 generates a signal of "0". The output of the comparator 78 is sent to the timing circuit 75. The timing circuit 75 waits a specified time T after the output of the comparator 78 changes from "0" to "1" and starts calling one-line image data from the image memory 74. Then, the LD driving circuit 73 drives the laser diode 71 in accordance with the image data, and thus, modulation emission is performed.

When the time T passes from the moment SOS when the synchronization signal rises from "0" to "1", on the photosensitive drum 121, printing of one line is started at a point P. Then, the printing is finished at a point Q, and this timing is referred to as EOI. In other words, printing is carried out in accordance with the image data between the points P and Q. Now, a case of printing a straight line S in parallel with the sub scanning direction c is examined. From the viewpoint of the main scanning direction b, in order to print the straight line S, a dot must be printed in each main scanning line exactly when a time T+t passes from the synchronization signal rising moment SOS. If the polygonal mirror motor 46 runs at a constant speed, the straight line S can be printed accurately. However, if the polygonal mirror motor 46 cannot keep the constant speed during the period T+t from the moment SOS, the scanning by the polygonal mirror 45 will cause an error. For example, a dot will be printed at a point y which is out of the right position to form a correct straight line S, and image disorder will occur.

Such image disorder is remarkable when a brush motor is used as the polygonal mirror motor 46. The following describes the composition of the polygonal mirror motor 46 and a technique to avoid affects of the inconstant rotating speed of the motor 46 and to prevent the image disorder.

FIGS. 7 through 10 show the composition of the polygonal mirror motor 46. The motor 46 has an armature core 61 with three coils 62 and a three-segmented commutator 63a, 63b and 63c around a rotary shaft 60, and the armature core 61 is capable of freely rotate inside a magnet 64. A mirror rest 68 is pressed and fitted on the rotary shaft 60, and the polygonal mirror 45 is fixed on the mirror rest 68 by a screw 69. Thereby, the polygonal mirror 45 becomes possible to rotate with the rotary shaft 60.

The circumferences of the commutator segments 63a, 63b and 63c are in contact with brushes 65, and thereby, a current supplied from a power source 66 is lead to the coils 62. Mutual reaction of the current flowing in the coils 62 and a magnetic flux of the magnet 64 generates a torque, and consequently, the rotary shaft 60 rotates together with the armature core 61.

FIG. 11 shows the driving circuit 76 of the polygonal mirror motor 46. A switch SW closes on receiving the control signal from the timing circuit 75. Thereby, the coils 62 is supplied with a current, and the rotary shaft 60 rotates. An IC 79 is a control integral circuit (specifically, AN6652 manufactured by Matsushita Electric Co., Ltd.) to keep the rotating speed of the motor 46 constant.

Figure 12:
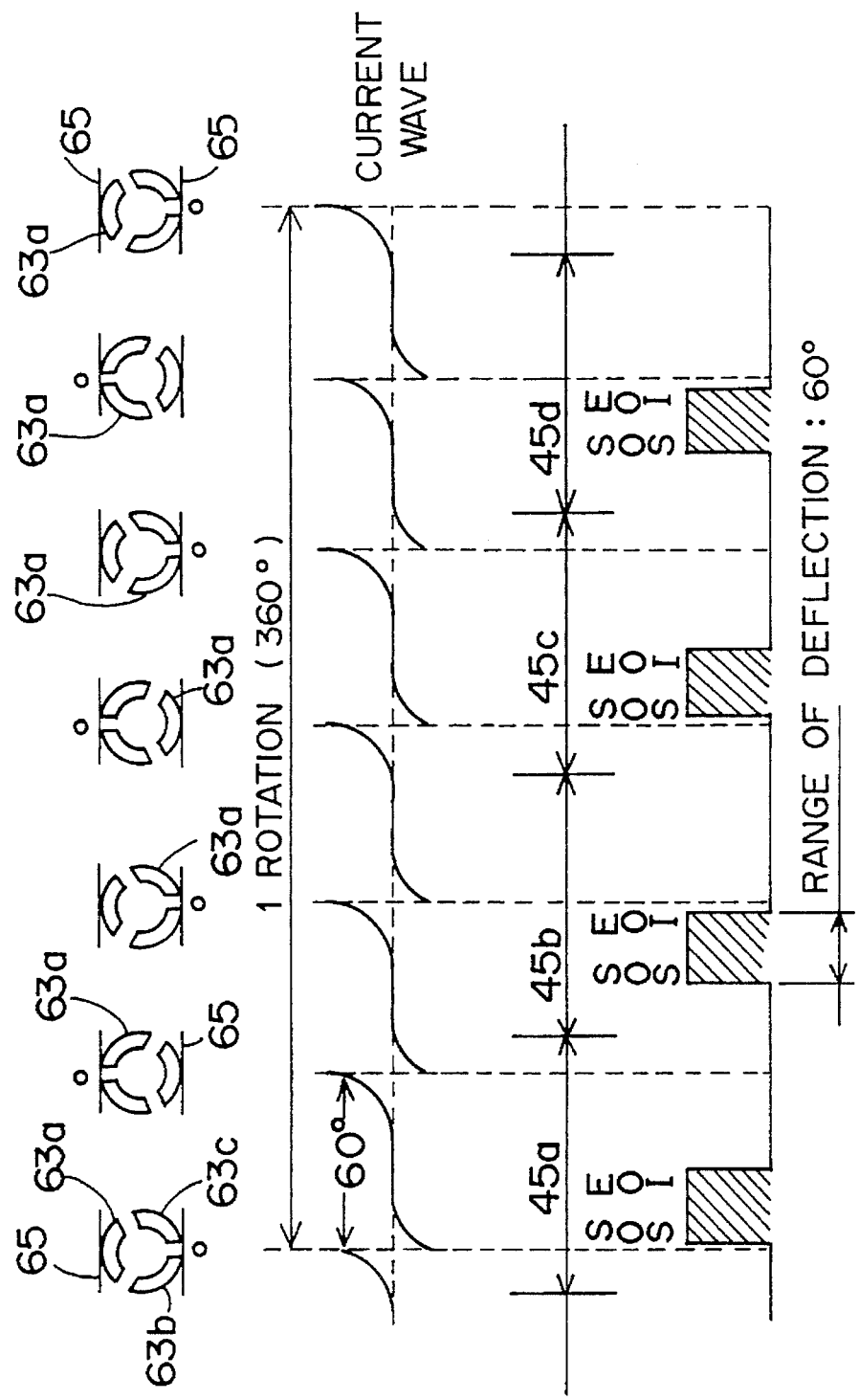
FIG. 12 is an explanatory view showing rotation of the commutator, changes in the motor current and the area of effective regions of deflecting facets during one rotation of the polygonal mirror motor in a model case.

The three commutator segments 63a, 63b and 63c, while the motor 46 is rotating, come into contact with and separate from the brushes 65 one after another. Thus, commutation occurs, and the current wave of the motor 46 changes. FIG. 12 shows occurrences of commutation, the current wave of the motor 46 and the effective regions of the deflecting facets 45a, 45b, 45c and 45d of the polygonal mirror 45 while the motor 46 makes one rotation. The effective regions of the deflecting facets 45a, 45b, 45c and 45d of the polygonal mirror 45 mean the regions of the respective facets 45a, 45b, 45c and 45d where the laser beam is deflected for scanning from SOS to EOI. Further, FIG. 12 shows a case wherein the laser beam is incident to the polygonal mirror 45 at a right angle to the brushes 65 (see FIG. 13). Circles in FIG. 12 indicate moments of commutation. The current of the motor 46 changes largely in these moments, but is stable in other periods. In moments of commutation an induced voltage occurs, and the torque and accordingly the rotating speed of the motor 46 changes. However, in periods other than the moments of commutation, the motor 46 can keep the rotating speed constant as a brushless motor does.

In this embodiment, the effective regions of the deflecting facets 45a, 45b, 45c and 45d are set such that the effective deflecting periods from SOS to EOI are out of the moments of commutation. Thus, although a brush motor is used as the polygonal mirror motor 46, affects of commutation can be avoided, and image disorder can be prevented. Specifically, the straight line S shown in FIG. 6 can be printed accurately.

Figure 13:
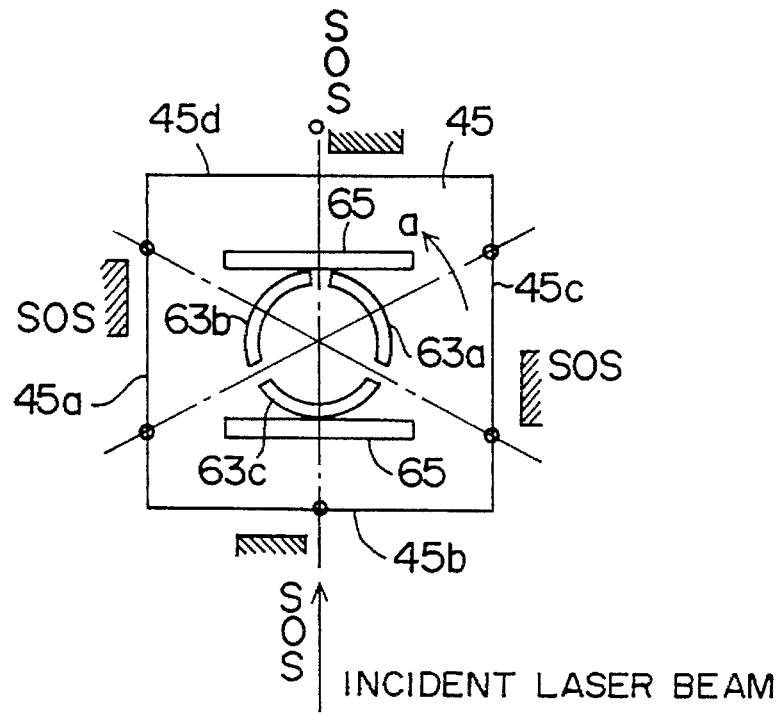
FIG. 13 is an explanatory view of the polygonal mirror and the polygonal mirror motor, showing commutation positions in the case of FIG. 12.

FIG. 13 shows the effective regions (shadowed regions) and commutation positions (indicated with circles) of the deflecting facets 45a, 45b, 45c and 45d of the polygonal mirror 45 in a case wherein the laser beam is incident to the polygonal mirror 45 at a right angle to the brushes 6. The commutation positions mean positions where the polygonal mirror 45 deflects the laser beam in the moments of commutation. The commutation positions depend on the segmentation of the commutator and in this embodiment, the commutation positions are located on equally six-divided points on the circumference. If the commutator segments 63a, 63b and 63c and the deflecting facets 45a, 45b, 45c and 45d of the polygonal mirror 45 have the positional relationship shown in FIG. 13, the effective region of the deflecting facets will be out of the commutation positions.

The polygonal mirror motor 46 has a bracket 85 which is protruded outside (see FIG. 15), and the brushes 65 are fixed on the bracket 85. Therefore, the positions of the brushes 65 can be recognized from outside. The polygonal mirror motor 46 is fitted to the housing 10 such that the laser beam will be incident to the polygonal mirror 45 at a right angle to the brushes 65. In order for the accurate fitting, a fitting portion which will engage with the protrusion of the bracket 85 should be prepared in the housing 10.

The positional relationship between the brushes 65 and the laser beam is determined, and thereafter, the polygonal mirror 45 is fitted to the rotary shaft 60 such that the deflecting facets of the polygonal mirror 45 will be desirably positioned with respect to the commutator segments 63a, 63b and 63c.

Next, the fitting of the polygonal mirror 45 to the motor 46 is described. The deflecting facets 45a, 45b, 45c and 45d are designed to have effective regions SOS through EOI located as shown in FIG. 13. The commutation positions are located at regular angles of 60 degrees from the rotation axis of the motor 45. Once the positional relationship between the laser beam incident to the polygonal mirror 45 and the brushes 65 is determined, the commutation positions with respect to the deflecting facets 45a, 45b, 45c and 45d of the polygonal mirror 45 are designated. Therefore, the positions of the deflecting facets 45a, 45b, 45c and 45d should be set on the basis of the positions of the commutator segments 63a, 63b and 63c.

Figure 20:
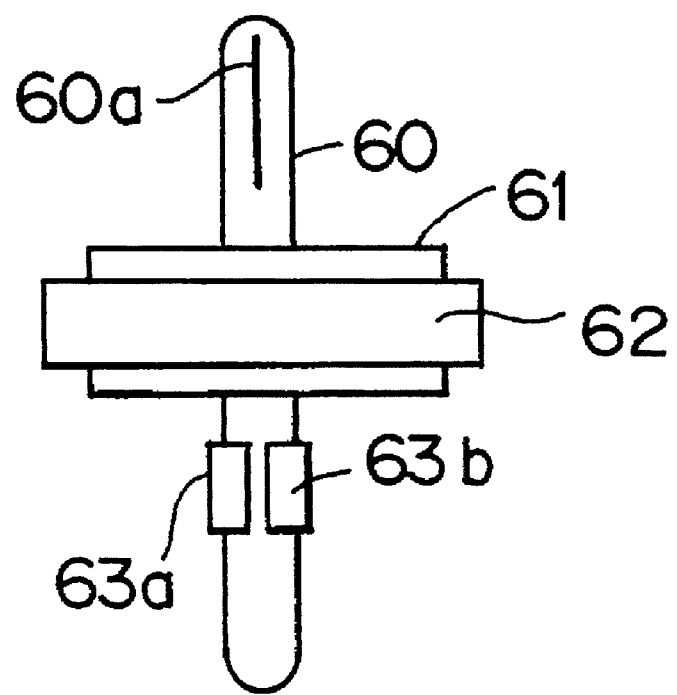
FIG. 20 is an explosive view of the polygonal mirror and a mirror rest, showing reference marks provided thereon.

FIG. 20 shows an exemplary way of setting the polygonal mirror 45 in the position shown in FIG. 13. The rotary shaft 60 has, on the upper portion, a mark 60a indicating the gap between the commutator segments 63a and 63b. The mirror rest 68 has a mark 68a on a side. The mirror rest 68 is pressed and fixed on the rotary shaft 60 such that the marks 60a and 68a will coincide. A person in the assembly line can see the mark 68a from outside, and the person places the mirror 45 on the mirror rest 68 watching the mark 68a. In this way, the polygonal mirror 45 can be fitted to the motor 46 such that the effective regions SOS through EOI of the deflecting facets are out of the commutation positions.

Instead of providing the marks 60a and 68a on the rotary shaft 60 and the mirror rest 68, other ways of making a reference may be possible. For example, instead of the marks 60a and 68a, grooves may be provided on the rotary shaft 60 and the mirror rest 68. In another way, a recess which will be a reference of the positioning of the polygonal mirror 45 may be made on the upper surface of the mirror rest 68. Further, the shaft holes of the rotary shaft 60 and the mirror rest 68 may be of a special configuration such as a triangle or any other polygon such that the deflecting facets of the polygonal mirror 45 will be positioned desirably with reference to the commutator segments 63a, 63b and 63c.

Figure 14:
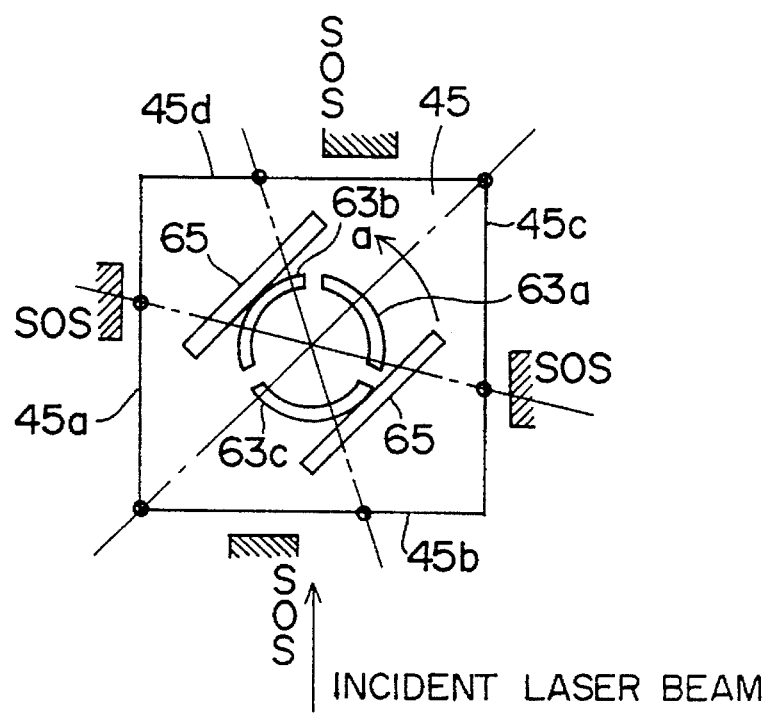
FIG. 14 is an explanatory view showing commutation positions in another model case.

FIG. 14 shows a case wherein the laser beam is incident to the polygonal mirror 45 at not a right angle to the brushes 65. In this case, the commutation positions, which are indicated with circles, are different from those in the case of FIG. 13. This indicates that timing of occurrences of commutation in the main scanning direction can be changed by changing the positions of the brushes 65 with reference to the laser beam incident to the polygonal mirror 45. Thus, by changing the set angles of the brushes 65, the commutation positions can be adjusted.

Figure 15:
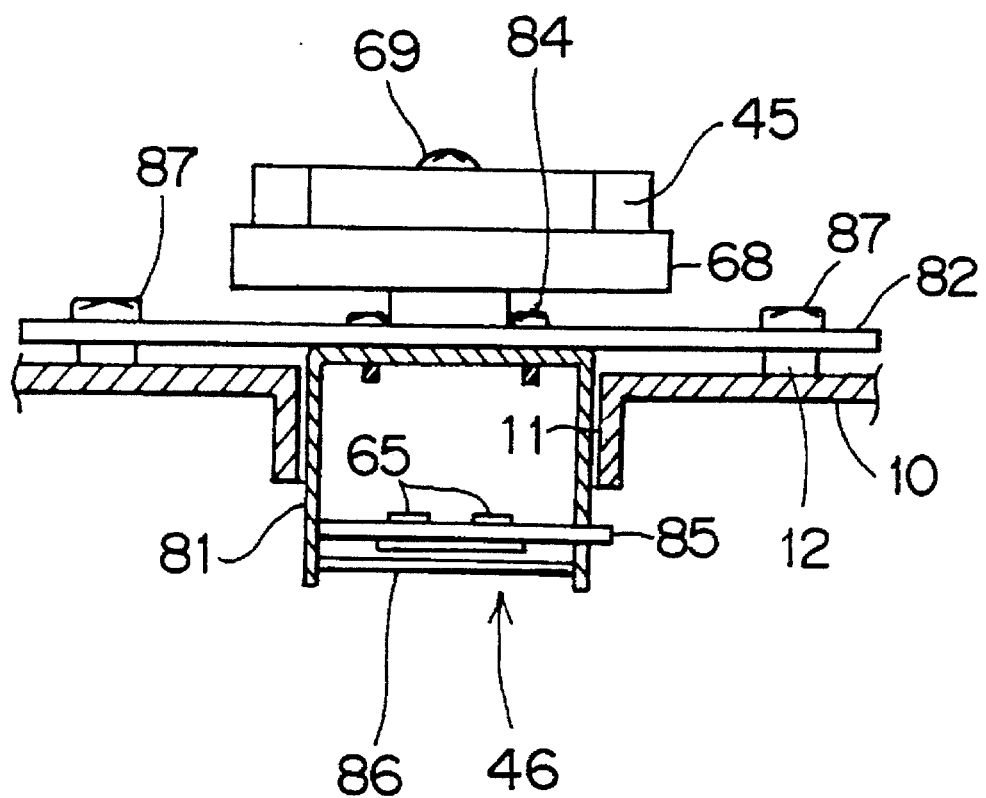
FIG. 15 is a fragmentary sectional view of the polygonal mirror and the polygonal mirror motor, showing fitting of the motor to a housing of the laser beam scanning system.
Figure 16:
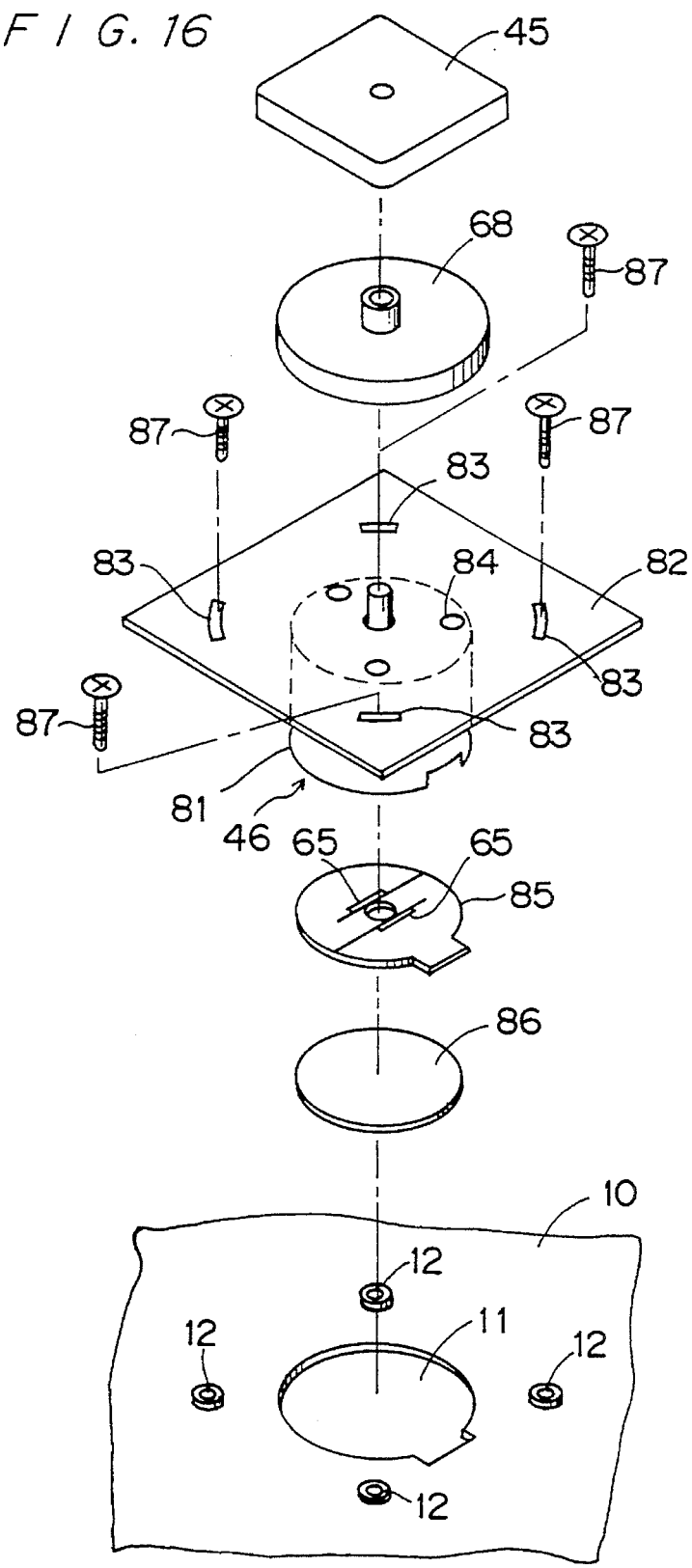
FIG. 16 is an explosive perspective view of the polygonal mirror and the polygonal mirror motor, showing the fitting of the motor to the housing of the laser beam scanning system.

FIGS. 15 and 16 show the composition for fitting of the motor 46 to the housing 10.

The frame 81 of the motor 46 is fixed to a fitting board 82 by vises 84. The mirror rest 68 and the polygonal mirror 45 are fitted to the rotary shaft 60 over the fitting board 82. The brushes 65 are fixed on the bracket 85, and the bracket 85 is fixed in the frame 81. Further, the frame 81 is provided with a bottom plate 86 and is closed.

The housing 10 has a hole 11 through which the motor frame 81 is fitted thereto and on the periphery of the hole 11, four screw holes 12 are made. The fitting board 82 has four slots 83 at corresponding positions with the screw holes 12. The slots 83 are arcs on a concentric circle of the rotary shaft 60.

The motor 46 is fixed on the housing 10 by screwing vises 87 into the holes 12 through the slots 83 of the fitting board 82. At that time, the fitting board 82 can be moved within the length of the slots 83, and thereby, the set positions of the brushes 65 with respect to the incident angle of the laser beam can be adjusted. Thus, adjustment to position the effective regions SOS through EOI of the deflecting facets of the polygonal mirror 45 out of the commutation positions is possible.

Figure 17:
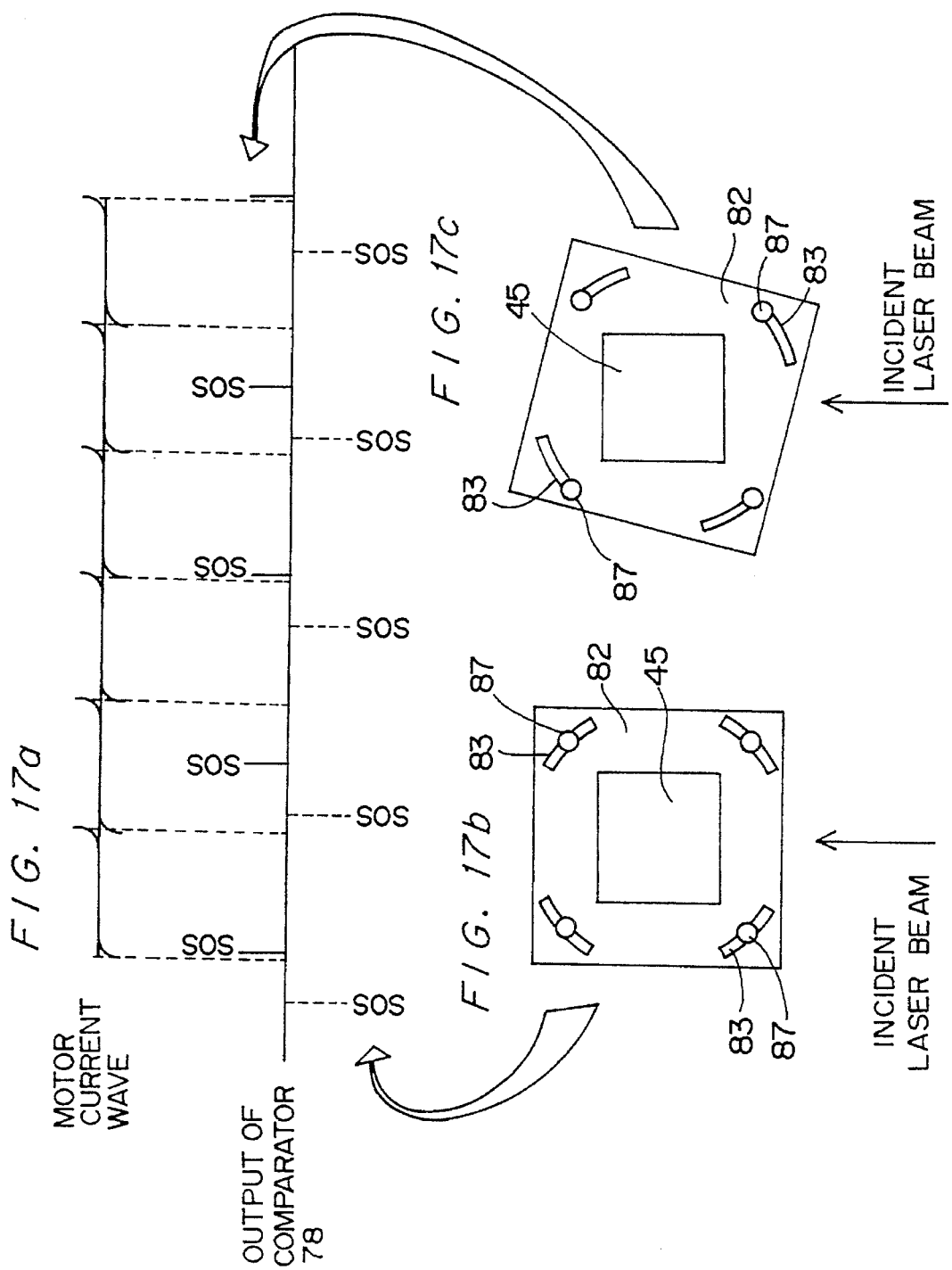
FIGS. 17a, 17b and 17c are explanatory views of a flitting board, showing adjustment of the fitting of the motor to the housing.

Now, the adjustment of the positions of the brushes 65 is specifically described. The laser diode 71 is driven for regular emission, and simultaneously the polygonal mirror 45 is rotated. In this state, the current wave of the power source of the motor 46 and the output wave of the comparator 78 are monitored by an oscilloscope. FIG. 17a shows wave patterns obtained in the monitor. By turning the fitting board 82, the positional relationship between the peaks of the current wave and the peaks of the output wave of the comparator 78 is changed. Accordingly, while watching the monitored wave patterns, a person in the assembly line should turn the fitting board 82 such that commutation will not occur in the effective deflecting periods from SOS to EOI. The vises 87 should be tightened up after adjusting the posture of the fitting board 82 in this way. For example, by turning the fitting board 82 from the posture of FIG. 17b to the posture of FIG. 17c, the occurrences of commutation and the effective deflecting periods can have mutual relationship as shown by FIG. 12. In such a case that the adjustment is carried out based on the rotation of the polygonal motor 46, the positional relationship between the commutator segments 63a, 63b and 63c and the deflecting facets of the polygonal mirror 45 does not have to be specific.

In the case of FIG. 12, since there are two brushes and three commutator segments, commutation occurs six times during one rotation of the motor 46, that is, commutation occurs at regular intervals of 60 degrees. Further, since the polygonal mirror 45 with four deflecting facets is fitted to the motor 46, In order to carry out scanning free from influence of the commutation, the effective regions of the deflecting facets 45a, 45b, 45c and 45d should be set to correspond to 30-degree rotation of the motor 46 at the maximum. While the motor 46 is rotating by an angle of θ, the laser beam is deflected in a range of 2 θ. Accordingly, in this case, the effective regions should be set within a maximum range of 60-degree deflection of the laser beam.

Figure 18:
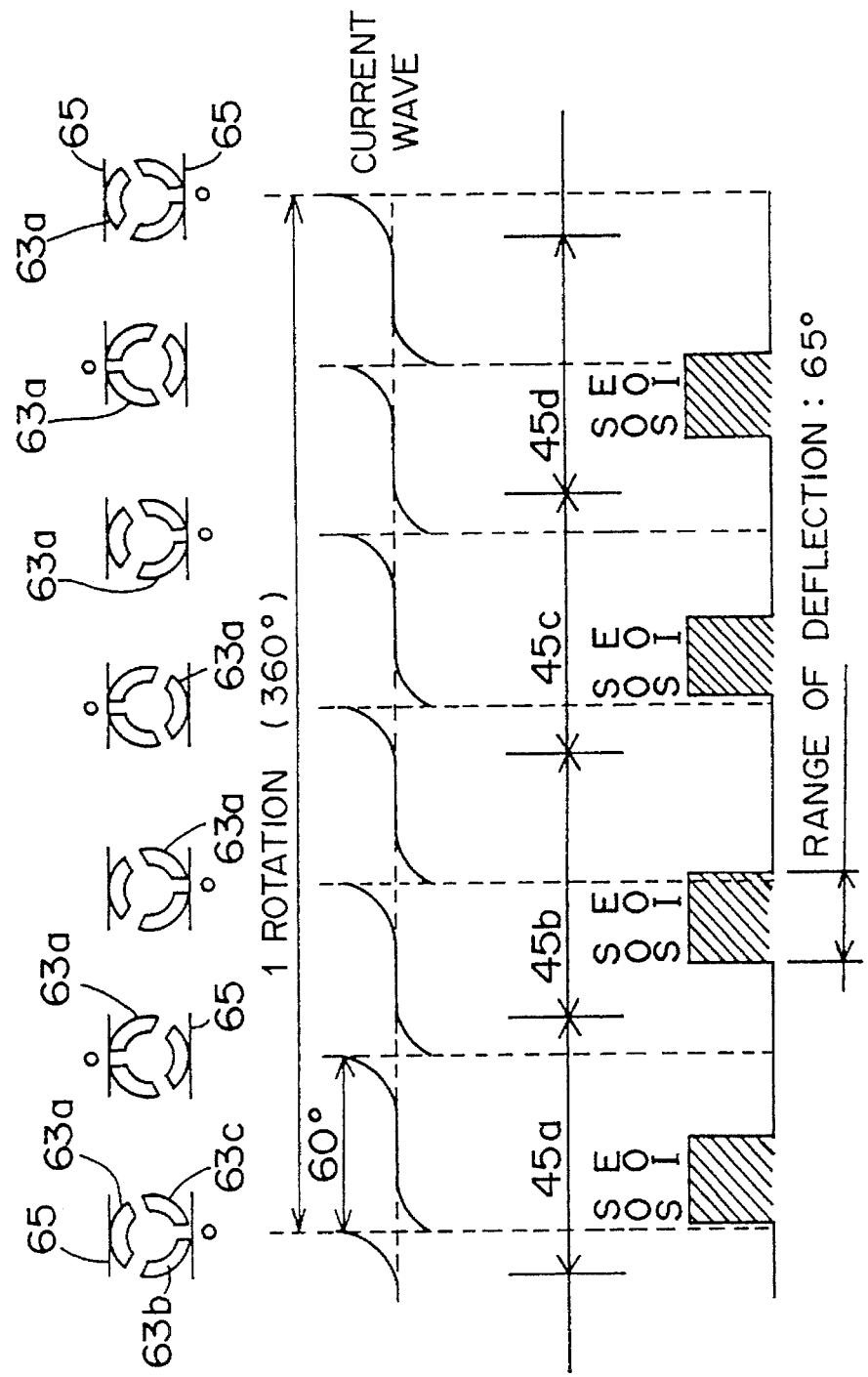
FIG. 18 is an explanatory view showing rotation of the commutator, changes in the motor current and the area of effective regions of deflecting facets during one rotation of the polygonal mirror motor in another model case.

If the field angle is larger, for example, if each of the effective regions SOS through EOI of the deflecting facets requires a 65-degree deflection range of the laser beam as shown in FIG. 18, at least one effective region SOS through EOI will include a commutation position. Even in this case, if the commutation position is set as close as possible to EOI, the influence of the commutation on the image can be avoided to the utmost.

Figure 19:
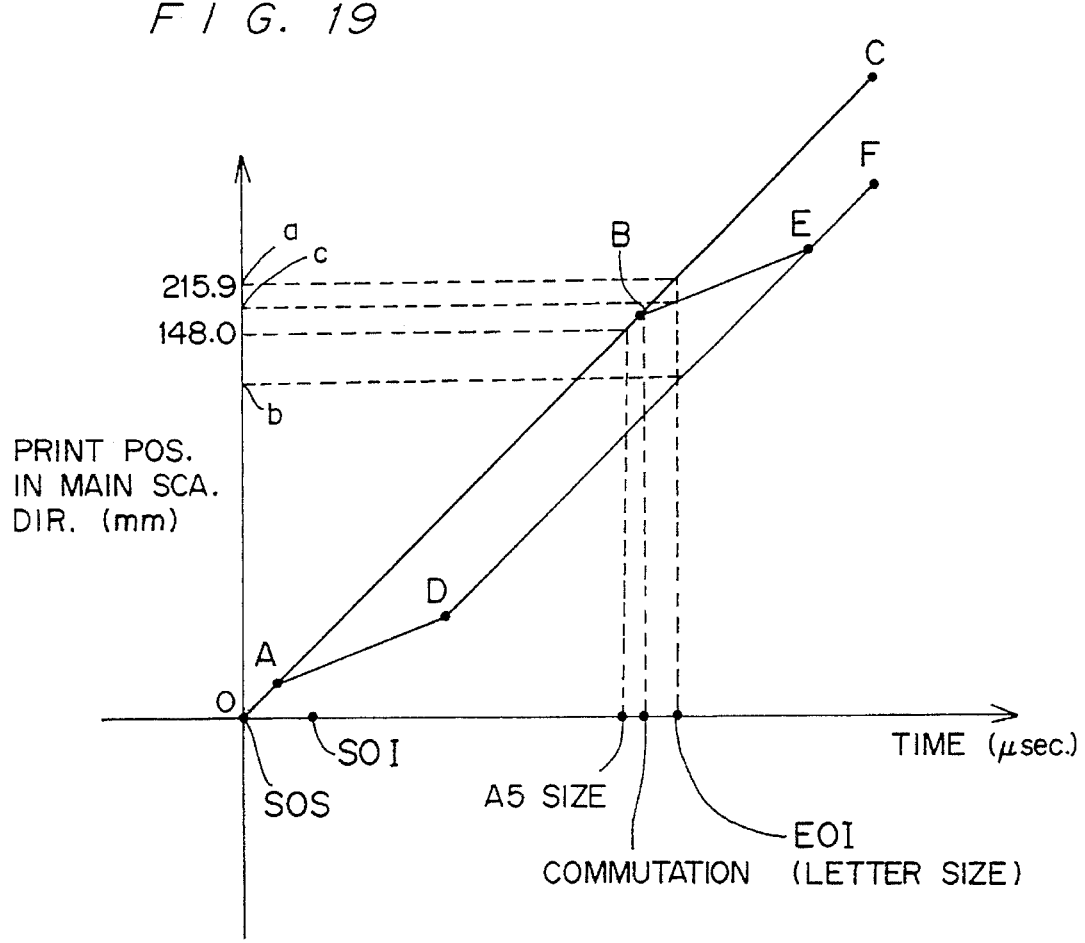
FIG. 19 is a graph showing the printing position on a photosensitive drum in the main scanning direction.

In the case of FIG. 18, the effective regions of the first deflecting facet 45a and the third deflecting facet 45c include no commutation positions, and portions of an image formed by these deflecting facets 45a and 45c are accurate. FIG. 19 is a graph plotting time on the x-axis versus printing position on the photosensitive drum 121 in the main scanning direction on the y-axis. Referring to FIG. 19, by the deflecting facets 45a and 45c, printing is carried out as indicated with a line OABC, and the printing position at the time of EOI is a point a. On the other hand, the effective regions of the second deflecting facet 45b and the fourth deflecting facet 45d include commutation positions, and printing by these deflecting facets 45b and 45d is not carried out as indicated with the line OABC. If the commutation occurs immediately after SOS, the printing will be carried out as indicated with a line OADEF. In this case, the printing position at the time of EOI is a point b. The distance (a–b) between the point b and the point a which is the correct printing position is large, and the image disorder caused thereby is remarkable. If the commutation occurs immediately before EOI, the printing will be carried out as indicated with a line OABEF. In this case, the printing position at the time of EOI is a point c. The distance (a–c) between the point c and the point a is much smaller than the distance (a–b), and the image disorder caused thereby is not practically a problem.

Further, if the commutation position is set close to EOI, in printing on a sheet of a small size, image disorder will not occur. In this embodiment, the maximum sheet size usable in the laser printer is a letter size, and the printing position at the time of EOI (point a) is the point of 215.9 mm. If the commutation positions included in the effective regions of the second and the fourth deflecting facets 45b and 45d are set at points corresponding to 60-degree deflection from the deflection angles of the laser beam at the respective times of SOS, the printing position at the times of commutation is 199.3 mm (215.9×$^{60}$/$_{65}$). Thus, in this case, image disorder will not be caused by the commutation in printing on an A5-sized sheet (148.0 mm in length of main scanning).

Further, in FIG. 19, the changes in the rotating speed of the motor 46 caused by the occurrences of commutation do not always agree with the lines AD and BE. The line AB is a model of the rotating speed of the motor 46 with no occurrences of commutation, and the lines AD and BE are models of reductions in the rotating speed with the occurrences of commutation.

In this embodiment, the motor 46 with the three-segmented commutator 63a, 63b and 63c (six commutation positions) and the polygonal mirror 45 with four deflecting facets are combined, and it is rather difficult to set the effective regions of the deflecting facets out of the commutation positions. In the embodiment, the effective regions of the deflecting facets must be set small, and high accuracy is required for fitting the polygonal mirror 45 to the motor 46 and for fitting the motor 46 to the housing 10.

As shown in FIG. 21, a combination of the motor 45 with the three-segmented commutator and a polygonal mirror 47 with six deflecting facets solves the above problem. The six commutation positions can be set at the borders 47x among the six deflecting facets of the polygonal mirror 47, and thereby, the effective regions can be set larger and more freely on the respective deflecting facets. Additionally, fitting the polygonal mirror 47 to the motor 46 and fitting the motor 46 to the housing 10 do not require so high accuracy.

These advantages are in any case wherein the number L of deflecting facets of the polygonal mirror and the number M of occurrences of commutation during one rotation of the motor fulfill a condition, L=M×n (n: natural number).

Also, in a case wherein the polygonal mirror and the motor fulfill a condition, M=L×n, more free setting of effective regions of the deflecting facets and easier fitting can be achieved by setting some of the commutation positions at the borders among the deflecting facets. FIG. 22 shows a combination of a polygonal mirror 48 with three deflecting facets and a motor with a three-segmented commutator, which Fulfills the condition. M=L×n. Since the commutation positions are set at the centers of the deflecting facets as well as at the borders among the deflecting facets, the effective regions are set in the areas A or B. However, the case of FIG. 22 is more advantageous than the case of FIG. 13 (M=6 and L=4), in point of setting of effective regions and fitting accuracy.

In this embodiment, a motor with a three-segmented commutator is used as the motor 46 of the polygonal mirror 45, but any other motor with any number of commutator segments may be used. In this embodiment, the brushes are fixed, while the commutator rotates. However, the brushes and the commutator can be made so as to rotate and to be fixed respectively.

The present invention is applicable widely to an image reader a two-dimensional image display and the like as well as a print head of a laser printer.

Although the present Invention has been described in connection with the preferred embodiment, it is to be noted that various changes and modifications are possible to those who are skilled in the art. Such changes and modifications are to be understood as being within the scope of the present invention.

What is claimed is:

1. A rotary scanner comprising:

a mirror with at least one deflecting facet for deflecting a light beam; and a motor for rotating the mirror, the motor having a plurality of commutator segments and brushes, at least one commutation position, where a brush is released from contact with a commutator segment and comes into contact with another commutator segment, being visible from outside.

2. A rotary scanner comprising:

a mirror with at least one deflecting facet for deflecting a light beam; and a motor for rotating the mirror, the motor having a plurality of commutator segments and brushes;

wherein the at least one deflecting facet of the mirror and commutation positions, where a brush is released from contact with a commutator segment and comes into contact with another commutator segment, have a specified mutual positional relationship.

3. A rotary scanner as claimed in claim 2, wherein:

the mirror has a plurality of deflecting facets; and the commutation positions are located at corresponding points with borders between the deflecting facets.

4. A rotary scanner for scanning a light beam, comprising:

a polygonal mirror with a number L of deflecting facets; and a motor for rotating the polygonal mirror, the motor having a plurality of commutator segments and brushes, commutation occurring M times during one rotation of the motor;

wherein the following condition is fulfilled:

$$L=M\times n,$$

wherein n is a natural number.

5. A rotary scanner for scanning a light beam, comprising:

a polygonal mirror with a number L of deflecting facets; and a motor for rotating the polygonal mirror, the motor having a plurality of commutator segments and brushes, commutation occurring M times during one rotation of the motor;

wherein the following condition is fulfilled:

$$M=L\times n,$$

wherein n is a natural number.

6. A light beam scanning system for scanning a light beam which is modulated in accordance with image data on a light receiving surface, the light beam scanning system comprising:

a mirror with at least one deflecting facet for deflecting the light beam modulated in accordance with image data; and a motor for rotating the mirror, the motor having a plurality of commutator segments and brushes, commutation positions, where a brush is released from contact with a commutator segment and comes into contact with another commutator segment, being set out of an effective region of the at least one deflecting facet which actually works for scanning of the light beam on the light receiving surface.

7. A light beam scanning system for scanning a light beam which is modulated in accordance with image data on a light receiving surface, the light beam scanning system comprising:

a light source for emitting a light beam;

driving means for driving the light source for regular emission and for modulation emission in accordance with image data;

a mirror for deflecting the light beam emitted from the light source and scanning the light beam on the light receiving surface, the mirror having at least one deflecting facet;

a motor for rotating the mirror, the motor having a plurality of commutator segments and brushes; and a photosensor which receives the light beam deflected by the deflecting facet with rotation of the mirror and generates a synchronization signal;

wherein:

the driving means starts driving the light source for the modulation emission based on the synchronization signal generated from the photosensor; and commutation occurs at a moment which is not during a period which extends from a moment when the photosensor receives the light beam deflected by the deflecting facet of the mirror to a moment when scanning for forming an image of at least one size ends.

8. A light beam scanning system for scanning a light beam which is modulated in accordance with image data on a light receiving surface, the light beam scanning system comprising:

a light source for emitting a light beam;

driving means for driving the light source for regular emission and for modulation emission in accordance with image data;

a mirror for deflecting the light beam emitted from the light source and scanning the light beam on a light receiving surface, the mirror having at least one deflecting facet;

a motor for rotating the mirror, the motor having a plurality of commutator segments and brushes; and a photosensor which receives the light beam deflected by the at least one deflecting facet with rotation of the mirror and generates a synchronization signal;

wherein:

the driving means starts driving the light source for the modulation emission based on the synchronization signal generated from the photosensor; and commutation occurs immediately before a moment when scanning ends.

9. A light beam scanning system for scanning a light beam which is modulated in accordance with image data on a light receiving surface, the light beam scanning system comprising:

a mirror for deflecting a light beam modulated in accordance with image data, the mirror having at least one deflecting facet;

a motor for rotating the mirror, the motor having a rotary shaft to which the mirror is fixed; and a motor fixing assembly which fixes the motor to a housing of the light beam scanning system, said motor fixing assembly having adjusting means which moves a body of the motor along a concentric circle of the rotary shaft of the motor to adjust a fixing position of the motor with respect to an incident angle of the light beam.

10. A light beam scanning system as claimed in claim 9, wherein:

the motor fixing assembly includes a fitting board to which the motor is fixed and is screwed to the housing of the light beam scanning system; and the adjusting means is a slot which is made in the fitting board at a corresponding position with a screw hole made in the housing, the slot being an arc on a concentric circle of the rotary shaft of the motor.

11. A rotary scanner comprising:

a mirror with at least one deflecting facet which deflects a light beam; and a motor which rotates the mirror, the motor having a plurality of commutator segments, brushes and an indicia which shows positions of the brushes and is visible from outside.

12. A rotary scanner as claimed in claim 11 further comprising a motor fixing assembly which fixes the motor at a predetermined position with respect to a light beam to be deflected by said mirror, said motor fixing assembly having adjusting means which moves a body of the motor along a concentric circle of a rotary shaft of the motor.

13. A rotary scanner as claimed in claim 12, wherein:

the motor fixing assembly includes a fitting board to which the motor is fixed by a vise; and the adjusting means is a slot which is made in the fitting board, the slot being an arc on a concentric circle of the rotary shaft of the motor.

14. A rotary scanner comprising:

a mirror with at least one deflecting facet which deflects a light beam; and a motor which rotates the mirror, the motor having a plurality of commutator segments, brushes and a rotary shaft having a first indicia which shows positions of the commutator segments and is visible from outside;

wherein said mirror is fixed to said rotary shaft of the motor based on the first indicia so as to have a predetermined positional relationship between the at least one deflecting facet and the commutator segments.

15. A rotary scanner as claimed in claim 14 further comprising a mirror fixing assembly which fixes said mirror to said rotary shaft of the motor, said mirror fixing assembly having a second indicia which is visible from outside;

wherein the mirror is fixed to the rotary shaft such that the first indicia and the second indicia coincide with each other.

16. A light beam scanning system for scanning a light beam which is modulated in accordance with image data, the light beam scanning system comprising:

a mirror which deflects the light beam to scan a light receiving surface; and a motor which rotates the mirror, the motor having a plurality of commutator segments and brushes;

wherein commutation occurs after scanning ends and before scanning begins.

17. A light beam scanning system for scanning a light beam which is modulated in accordance with image data, the light beam scanning system comprising:

a mirror which deflects the light beam to scan a light receiving surface; and a motor which rotates the mirror, the motor having a plurality of commutator segments and brushes;

wherein commutation occurs immediately before scanning ends.

* * * * *